(No Model.)

J. KING.
TRIAL LENS.

No. 296,841. Patented Apr. 15, 1884.

Witnesses:
J. H. Burridge
C. H. Turney

Inventor:
J. King
W. H. Burridge, Atty.

N. PETERS, Photo-Lithographer, Washington, D. C.

UNITED STATES PATENT OFFICE.

JULIUS KING, OF CLEVELAND, OHIO.

TRIAL-LENS.

SPECIFICATION forming part of Letters Patent No. 296,841, dated April 15, 1884.

Application filed December 13, 1883. (No model.)

*To all whom it may concern:*

Be it known that I, JULIUS KING, of Cleveland, in the county of Cuyahoga and State of Ohio, have invented a certain new and Improved Combination Trial Set Lens; and I do hereby declare that the following is a full, clear, and complete description thereof.

The object of the abovesaid invention is for testing the strength or seeing capacity of the eyes, in order to ascertain their power, and the difference in their focal distance, if any exist, so that they may have suitable glasses adapted to them for correcting their defects.

Figure 1:
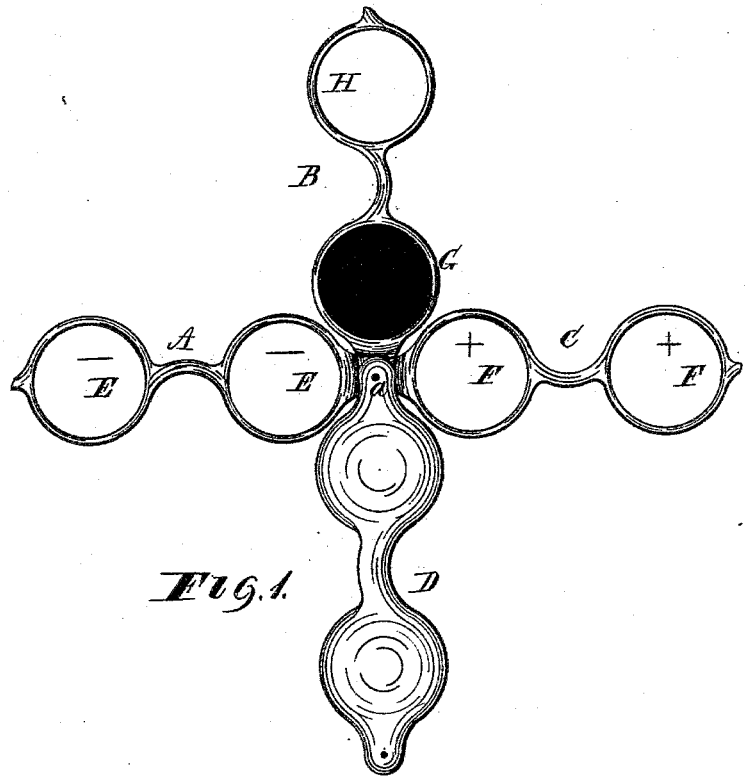
Figure 2:

Reference is made to the annexed drawings, the same making a part of this specification, in which Figure 1 represents a view of the instrument when open for practical use. Fig. 2 shows an edge view of the instrument when closed.

Like letters of reference denote like parts in the drawings.

It is a well-known fact that the eyes of different persons vary in their powers, and that the eyes of the same person may differ more or less in their focal distance.

To fit each eye or both with an exactly suitable lens, so that there shall be no apparent distortion or indistinctness of the object presented to the eyes, has heretofore been a matter of no little trouble to the optician, for the want of a good instrument for detecting the defects of the eyes; hence the patient is apt to find his defective vision but slightly improved by the glasses provided for him. To meet this want on the part of the optician, the instrument above alluded to is provided. It consists of an arrangement of frames, A, B, and C, composed of a rubber, metal, or any other suitable material. One end of each of the frames is pivoted at *a* to the end of the case D, which corresponds in contour to the shape of the said frames, and into which the several frames may be shut, as shown in Fig. 2, and which serves for a handle whereby to hold the instrument while using it. The frame A is set with a pair of — or concave lenses, E and E, and in the frame C is set a pair of + or convex lenses, F F, of slight power. In the frame B is set an opaque disk, G, the opposite end of the frame having a clear opening, H.

In order to ascertain whether there is any difference in the two eyes of a person, the frame B is held before them so that one eye (which, for convenience of illustration, is the right eye) is directly before the opaque disk, thereby preventing that eye from seeing, while the left one is looking through the opening H. The discerning-power of the eye looking through the opening H is then carefully noted as respect to distance and clearness by means of any of the well known tests or systems of letters or signs. This being done, the frame is then reversed and the opaque disk placed before the left eye. The right eye now looks through the opening H. Its discerning-power is carefully noted, as was the left. The two notings are then compared. If the two eyes are found to have the same or different focal distances, a pair of spectacles corresponding in power to the result of the trial are then placed before the eyes of the patient. The concave lenses of the frame A or the frame C of convex lenses, as the nature of the case being treated may require, is now held before the spectacles or glasses through which the patient is looking, to determine whether the power of the said glasses on the eyes of the patient must be increased or diminished, which is readily done by substituting spectacles or lenses of other powers, as the case may demand.

The object of this instrument is also to determine when the eyes are correctly fitted. For example, if, on successively placing before the spectacles that a person is wearing the convex and concave lenses, neither one improves the vision, it shows that the eyes are correctly fitted.

I do not confine myself to the number of frames of lenses described, and shown in the drawings, as a greater number of frames and lenses of varying degrees of refractive power may be used without changing the nature of my invention.

What I claim as my invention, and desire to secure by Letters Patent, is—

A combination trial set of lenses and an opaque disk consisting of the frames A B C, the frame A having set therein a pair of — or concave lenses, and the frame C with + or convex lenses, (the above concave and convex of slight power,) and a frame, B, having set therein an opaque disk, whereas the opposite end of frame is a clear opening, the said frames being pivoted in a case or handle, D, substantially as herein set forth, and for the purpose specified.

In testimony whereof I affix my signature in presence of two witnesses.

JULIUS KING.

Witnesses:
J. H. BURRIDGE,
C. H. TURNEY.